(12) United States Patent
Nicholls et al.

(10) Patent No.: US 9,343,102 B1
(45) Date of Patent: May 17, 2016

(54) DATA STORAGE DEVICE EMPLOYING A PHASE OFFSET TO GENERATE POWER FROM A SPINDLE MOTOR DURING A POWER FAILURE

(71) Applicant: Western Digital Technologies, Inc., Irvine, CA (US)

(72) Inventors: Michael Troy Nicholls, Laguna Hills, CA (US); Joseph J. Crowfoot, Costa Mesa, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/668,940

(22) Filed: Mar. 25, 2015

(51) Int. Cl.
*G11B 19/20* (2006.01)
*H02P 6/18* (2016.01)

(52) U.S. Cl.
CPC ........ *G11B 19/2081* (2013.01); *G11B 19/2009* (2013.01); *H02P 6/182* (2013.01)

(58) Field of Classification Search
None
See application file for complete search history.

(56) References Cited

U.S. PATENT DOCUMENTS

| | | | |
|---|---|---|---|
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |

(Continued)

OTHER PUBLICATIONS

Michael T. Nicholls, U.S. Appl. No. 14/582,068, filed Dec. 23, 2014, 23 pages.

(Continued)

*Primary Examiner* — Wayne Young
*Assistant Examiner* — James L Habermehl (57) ABSTRACT

A data storage device is disclosed comprising a disk, a spindle motor configured to rotate the disk, wherein the spindle motor comprises a plurality of windings, and a head actuated over the disk. The windings are commutated based on a commutation sequence while applying a periodic driving voltage to each winding, wherein the periodic driving voltage comprises an operating amplitude during normal operation. When a supply voltage falls below a threshold, the spindle motor is configured into a power generator by at least adjusting a phase of the periodic driving voltage by a phase offset and adjusting the amplitude of the periodic driving voltage based on the phase offset.

24 Claims, 5 Drawing Sheets

(56) References Cited

U.S. PATENT DOCUMENTS

| | | |
|---|---|---|
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,865,049 B1 | 3/2005 | Codilian et al. |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,078,873 B2 * | 7/2006 | Suzuki et al. ............ 318/437 |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,161,757 B1 | 1/2007 | Krishnamoorthy et al. |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,211,973 B1 * | 5/2007 | Hoo et al. ............ 318/400.34 |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,327,106 B1 * | 2/2008 | Hoo et al. ............ 318/400.34 |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |

(56) References Cited

U.S. PATENT DOCUMENTS

| | | | |
|---|---|---|---|
| 7,492,546 | B1 | 2/2009 | Miyamura |
| 7,495,857 | B1 | 2/2009 | Bennett |
| 7,499,236 | B1 | 3/2009 | Lee et al. |
| 7,502,192 | B1 | 3/2009 | Wang et al. |
| 7,502,195 | B1 | 3/2009 | Wu et al. |
| 7,502,197 | B1 | 3/2009 | Chue |
| 7,505,223 | B1 | 3/2009 | McCornack |
| 7,542,225 | B1 | 6/2009 | Ding et al. |
| 7,548,392 | B1 | 6/2009 | Desai et al. |
| 7,551,390 | B1 | 6/2009 | Wang et al. |
| 7,558,016 | B1 | 7/2009 | Le et al. |
| 7,560,883 | B1 * | 7/2009 | Hoo et al. ............ 318/254.1 |
| 7,573,670 | B1 | 8/2009 | Ryan et al. |
| 7,576,941 | B1 | 8/2009 | Chen et al. |
| 7,580,212 | B1 | 8/2009 | Li et al. |
| 7,583,470 | B1 | 9/2009 | Chen et al. |
| 7,595,954 | B1 | 9/2009 | Chen et al. |
| 7,602,575 | B1 | 10/2009 | Lifchits et al. |
| 7,616,399 | B1 | 11/2009 | Chen et al. |
| 7,619,844 | B1 | 11/2009 | Bennett |
| 7,626,782 | B1 | 12/2009 | Yu et al. |
| 7,630,162 | B2 | 12/2009 | Zhao et al. |
| 7,639,447 | B1 | 12/2009 | Yu et al. |
| 7,656,604 | B1 | 2/2010 | Liang et al. |
| 7,656,607 | B1 | 2/2010 | Bennett |
| 7,660,067 | B1 | 2/2010 | Ji et al. |
| 7,663,835 | B1 | 2/2010 | Yu et al. |
| 7,675,707 | B1 | 3/2010 | Liu et al. |
| 7,679,854 | B1 | 3/2010 | Narayana et al. |
| 7,688,534 | B1 | 3/2010 | McCornack |
| 7,688,538 | B1 | 3/2010 | Chen et al. |
| 7,688,539 | B1 | 3/2010 | Bryant et al. |
| 7,697,233 | B1 | 4/2010 | Bennett et al. |
| 7,701,661 | B1 | 4/2010 | Bennett |
| 7,710,676 | B1 | 5/2010 | Chue |
| 7,715,138 | B1 | 5/2010 | Kupferman |
| 7,729,079 | B1 | 6/2010 | Huber |
| 7,733,189 | B1 | 6/2010 | Bennett |
| 7,746,592 | B1 | 6/2010 | Liang et al. |
| 7,746,594 | B1 | 6/2010 | Guo et al. |
| 7,746,595 | B1 | 6/2010 | Guo et al. |
| 7,760,461 | B1 | 7/2010 | Bennett |
| 7,800,853 | B1 | 9/2010 | Guo et al. |
| 7,800,856 | B1 | 9/2010 | Bennett et al. |
| 7,800,857 | B1 | 9/2010 | Calaway et al. |
| 7,816,876 | B2 * | 10/2010 | Tomigashi ............ 318/400.02 |
| 7,839,102 | B1 * | 11/2010 | Rana et al. ............ 318/254.1 |
| 7,839,591 | B1 | 11/2010 | Weerasooriya et al. |
| 7,839,595 | B1 | 11/2010 | Chue et al. |
| 7,839,600 | B1 | 11/2010 | Babinski et al. |
| 7,843,662 | B1 | 11/2010 | Weerasooriya et al. |
| 7,852,588 | B1 | 12/2010 | Ferris et al. |
| 7,852,592 | B1 | 12/2010 | Liang et al. |
| 7,864,481 | B1 | 1/2011 | Kon et al. |
| 7,864,482 | B1 | 1/2011 | Babinski et al. |
| 7,869,155 | B1 | 1/2011 | Wong |
| 7,876,522 | B1 | 1/2011 | Calaway et al. |
| 7,876,523 | B1 | 1/2011 | Panyavoravaj et al. |
| 7,916,415 | B1 | 3/2011 | Chue |
| 7,916,416 | B1 | 3/2011 | Guo et al. |
| 7,916,420 | B1 | 3/2011 | McFadyen et al. |
| 7,916,422 | B1 | 3/2011 | Guo et al. |
| 7,929,238 | B1 | 4/2011 | Vasquez |
| 7,961,422 | B1 | 6/2011 | Chen et al. |
| 7,974,038 | B2 | 7/2011 | Krishnan et al. |
| 8,000,053 | B1 | 8/2011 | Anderson |
| 8,031,423 | B1 | 10/2011 | Tsai et al. |
| 8,054,022 | B1 | 11/2011 | Ryan et al. |
| 8,059,357 | B1 | 11/2011 | Knigge et al. |
| 8,059,360 | B1 | 11/2011 | Melkote et al. |
| 8,072,703 | B1 | 12/2011 | Calaway et al. |
| 8,077,428 | B1 | 12/2011 | Chen et al. |
| 8,078,901 | B1 | 12/2011 | Meyer et al. |
| 8,081,395 | B1 | 12/2011 | Ferris |
| 8,085,020 | B1 | 12/2011 | Bennett |
| 8,116,023 | B1 | 2/2012 | Kupferman |
| 8,145,934 | B1 | 3/2012 | Ferris et al. |
| 8,179,626 | B1 | 5/2012 | Ryan et al. |
| 8,189,286 | B1 | 5/2012 | Chen et al. |
| 8,213,106 | B1 | 7/2012 | Guo et al. |
| 8,254,222 | B1 | 8/2012 | Tang |
| 8,300,348 | B1 | 10/2012 | Liu et al. |
| 8,315,005 | B1 | 11/2012 | Zou et al. |
| 8,320,069 | B1 | 11/2012 | Knigge et al. |
| 8,351,174 | B1 | 1/2013 | Gardner et al. |
| 8,358,114 | B1 | 1/2013 | Ferris et al. |
| 8,358,145 | B1 | 1/2013 | Ferris et al. |
| 8,390,367 | B1 | 3/2013 | Bennett |
| 8,432,031 | B1 | 4/2013 | Agness et al. |
| 8,432,629 | B1 | 4/2013 | Rigney et al. |
| 8,451,697 | B1 | 5/2013 | Rigney et al. |
| 8,471,509 | B2 | 6/2013 | Bonvin |
| 8,482,873 | B1 | 7/2013 | Chue et al. |
| 8,498,076 | B1 | 7/2013 | Sheh et al. |
| 8,498,172 | B1 | 7/2013 | Patton, III et al. |
| 8,508,881 | B1 | 8/2013 | Babinski et al. |
| 8,531,798 | B1 | 9/2013 | Xi et al. |
| 8,537,486 | B2 | 9/2013 | Liang et al. |
| 8,542,455 | B2 | 9/2013 | Huang et al. |
| 8,553,351 | B1 | 10/2013 | Narayana et al. |
| 8,564,899 | B2 | 10/2013 | Lou et al. |
| 8,576,506 | B1 | 11/2013 | Wang et al. |
| 8,605,382 | B1 | 12/2013 | Mallary et al. |
| 8,605,384 | B1 | 12/2013 | Liu et al. |
| 8,610,391 | B1 * | 12/2013 | Yang et al. ............ 360/73.03 |
| 8,611,040 | B1 | 12/2013 | Xi et al. |
| 8,619,385 | B1 | 12/2013 | Guo et al. |
| 8,630,054 | B2 | 1/2014 | Bennett et al. |
| 8,630,059 | B1 | 1/2014 | Chen et al. |
| 8,634,154 | B1 | 1/2014 | Rigney et al. |
| 8,634,283 | B1 | 1/2014 | Rigney et al. |
| 8,643,976 | B1 | 2/2014 | Wang et al. |
| 8,649,121 | B1 | 2/2014 | Smith et al. |
| 8,654,466 | B1 | 2/2014 | McFadyen |
| 8,654,467 | B1 | 2/2014 | Wong et al. |
| 8,665,546 | B1 | 3/2014 | Zhao et al. |
| 8,665,551 | B1 | 3/2014 | Rigney et al. |
| 8,670,206 | B1 | 3/2014 | Liang et al. |
| 8,687,312 | B1 | 4/2014 | Liang |
| 8,693,123 | B1 | 4/2014 | Guo et al. |
| 8,693,134 | B1 | 4/2014 | Xi et al. |
| 8,699,173 | B1 | 4/2014 | Kang et al. |
| 8,711,027 | B1 | 4/2014 | Bennett |
| 8,717,696 | B1 | 5/2014 | Ryan et al. |
| 8,717,699 | B1 | 5/2014 | Ferris |
| 8,717,704 | B1 | 5/2014 | Yu et al. |
| 8,724,245 | B1 | 5/2014 | Smith et al. |
| 8,724,253 | B1 | 5/2014 | Liang et al. |
| 8,724,422 | B1 | 5/2014 | Agness et al. |
| 8,724,524 | B2 | 5/2014 | Urabe et al. |
| 8,737,008 | B1 | 5/2014 | Watanabe et al. |
| 8,737,013 | B2 | 5/2014 | Zhou et al. |
| 8,743,495 | B1 | 6/2014 | Chen et al. |
| 8,743,503 | B1 | 6/2014 | Tang et al. |
| 8,743,504 | B1 | 6/2014 | Bryant et al. |
| 8,749,904 | B1 | 6/2014 | Liang et al. |
| 8,760,796 | B1 | 6/2014 | Lou et al. |
| 8,767,332 | B1 | 7/2014 | Chahwan et al. |
| 8,767,343 | B1 | 7/2014 | Helmick et al. |
| 8,767,354 | B1 | 7/2014 | Ferris et al. |
| 8,773,787 | B1 | 7/2014 | Beker |
| 8,779,574 | B1 | 7/2014 | Agness et al. |
| 8,780,473 | B1 | 7/2014 | Zhao et al. |
| 8,780,477 | B1 | 7/2014 | Guo et al. |
| 8,780,479 | B1 | 7/2014 | Helmick et al. |
| 8,780,489 | B1 | 7/2014 | Gayaka et al. |
| 8,792,202 | B1 | 7/2014 | Wan et al. |
| 8,797,664 | B1 | 8/2014 | Guo et al. |
| 8,804,267 | B2 | 8/2014 | Huang et al. |
| 8,824,081 | B1 | 9/2014 | Guo et al. |
| 8,824,262 | B1 | 9/2014 | Liu et al. |
| 8,873,193 | B2 | 10/2014 | Galbiati |
| 9,093,105 | B2 | 7/2015 | Ferris et al. |
| 2008/0111423 | A1 | 5/2008 | Baker et al. |

(56) References Cited

U.S. PATENT DOCUMENTS

| | | |
|---|---|---|
| 2010/0002331 A1 | 1/2010 | Tan |
| 2010/0035085 A1 | 2/2010 | Jung et al. |
| 2011/0198931 A1 | 8/2011 | Ly |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

Michael T. Nicholls, U.S. Appl. No. 14/668,949, filed Mar. 25, 2015, 28 pages.

* cited by examiner

DATA STORAGE DEVICE EMPLOYING A PHASE OFFSET TO GENERATE POWER FROM A SPINDLE MOTOR DURING A POWER FAILURE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
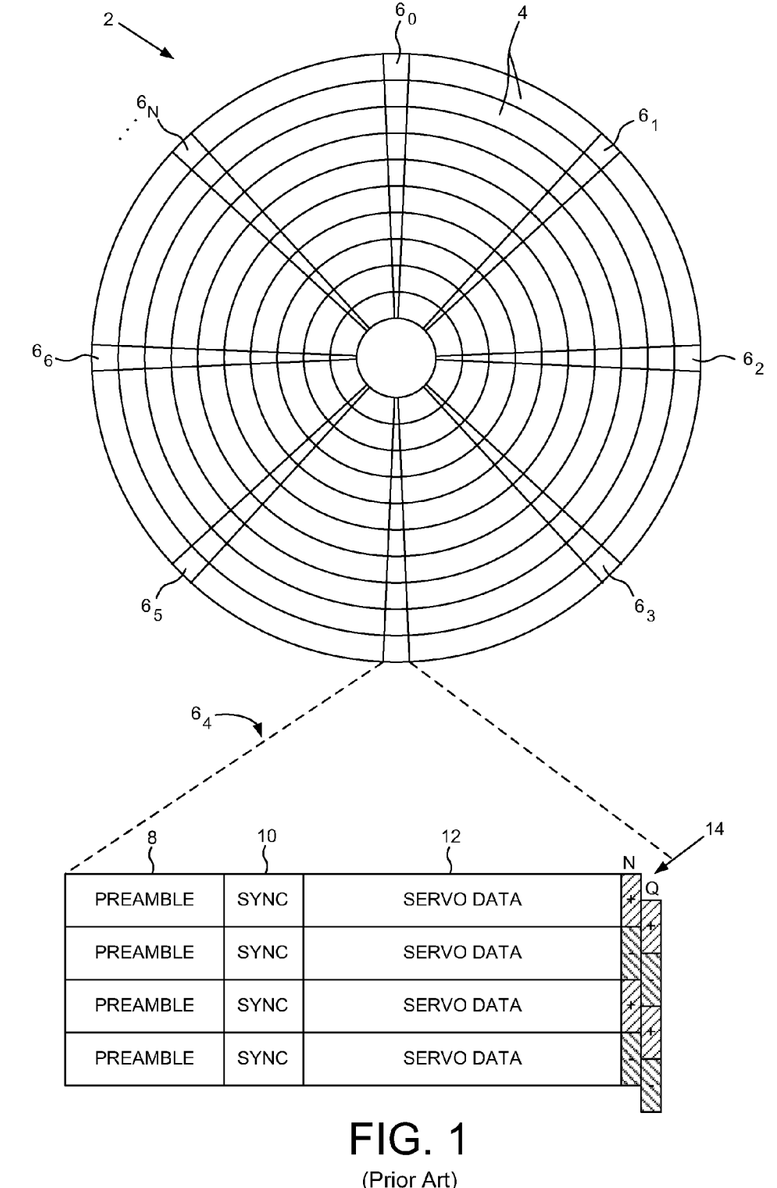
FIG. 1 shows a prior art disk format comprising servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

The disk 2 is typically rotated by a spindle motor at a high speed so that an air bearing forms between the head and the disk surface. A commutation controller applies a driving signal to the windings of the spindle motor using a particular commutation sequence in order to generate a rotating magnetic field that causes the spindle motor to rotate. Prior art disk drives have typically controlled the commutation of the windings by measuring a zero-crossing frequency of a back electromotive force (BEMF) voltage generated by the windings of the spindle motor. Prior art disk drives may also utilize the BEMF voltage generated by the spindle motor as a power source during power failure to assist with power down operations, such as unloading the head onto a ramp.

DETAILED DESCRIPTION

Figures 2A, 2B:
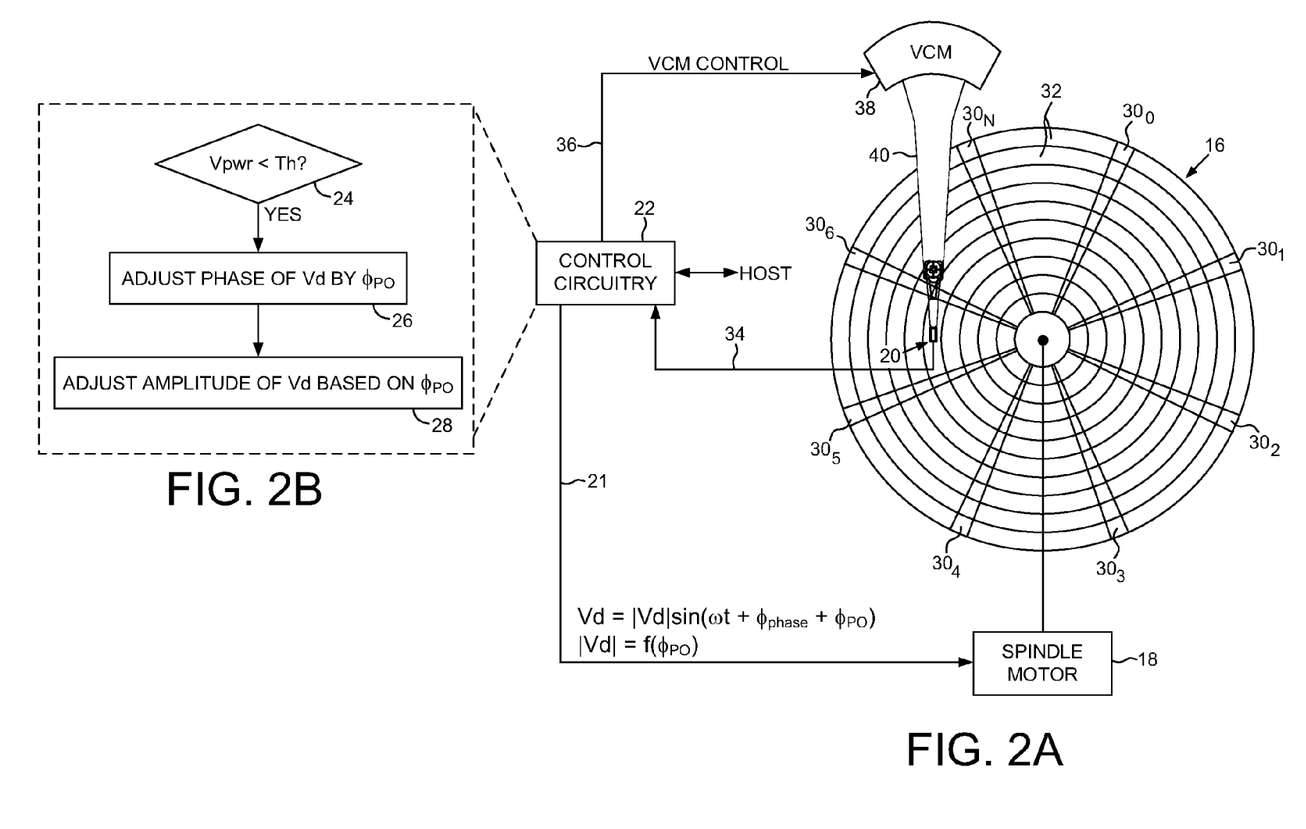
FIG. 2A shows a data storage device in the form of a disk drive according to an embodiment comprising a head actuated over a disk rotated by a spindle motor.
FIG. 2B is a flow diagram according to an embodiment wherein when a supply voltage falls below a threshold the spindle motor is configured into a power generator by adjusting a phase of a periodic driving voltage by a phase offset and by adjusting an amplitude of the periodic driving voltage based on the phase offset.

FIG. 2A shows a data storage device in the form of a disk drive according to an embodiment comprising a disk 16, a spindle motor 18 configured to rotate the disk 16, wherein the spindle motor 18 comprises a plurality of windings, and a head 20 actuated over the disk. The windings are commutated based on a commutation sequence while applying a periodic driving voltage 21 to each winding, wherein the periodic driving voltage comprises an operating amplitude during normal operation. The disk drive further comprises control circuitry 22 powered by a supply voltage and configured to execute the flow diagram of FIG. 2B, wherein when the supply voltage falls below a threshold (block 24), the spindle motor is configured into a power generator by at least adjusting a phase of the periodic driving voltage by a phase offset (block 26) and adjusting the amplitude of the periodic driving voltage based on the phase offset (block 28).

In the embodiment of FIG. 2A, the disk 16 comprises a plurality of servo sectors $30_0$-$30_N$ that define a plurality of servo tracks 32, wherein data tracks are defined relative to the servo tracks at the same or different radial density. The control circuitry 22 processes a read signal 34 emanating from the head 20 to demodulate the servo sectors $30_0$-$30_N$ and generate a position error signal (PES) representing an error between the actual position of the head and a target position relative to a target track. A servo control system in the control circuitry 22 filters the PES using a suitable compensation filter to generate a control signal 36 applied to a voice coil motor (VCM) 38 which rotates an actuator arm 40 about a pivot in order to actuate the head 20 radially over the disk 16 in a direction that reduces the PES. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3:
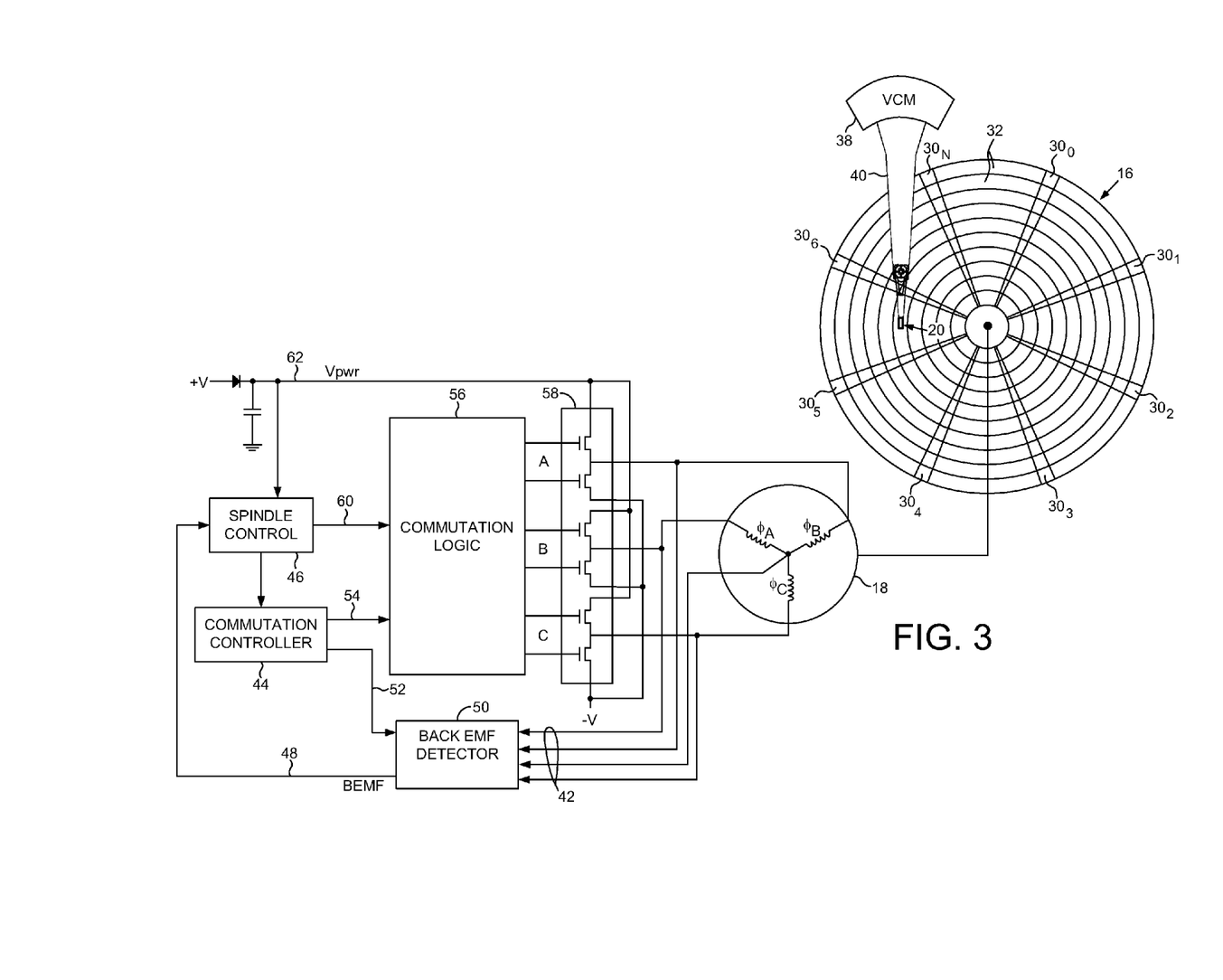
FIG. 3 shows control circuitry according to an embodiment comprising a plurality of switches for driving the windings of the spindle motor based on a commutation sequence.

FIG. 3 shows control circuitry 22 according to an embodiment wherein a back electromotive force (BEMF) voltage 42 generated by the windings of the spindle motor 18 may be processed in order to drive the commutation sequence of a commutation controller 44. A spindle control block 46 may process a BEMF signal 48 which may be a square wave representing the BEMF zero-crossings as detected by a BEMF detector 50. The commutation controller 44 may generate a control signal 52 which configures the BEMF detector 50 to detect the zero-crossing of the BEMF voltage generated by each winding as the disk rotates. The commutation controller 44 also generates a control signal 54 applied to commutation logic 56. In the embodiment of FIG. 3, the commutation logic 56 is configured by the control signal 54 to control the state of switches 58 in order to drive the windings with driving voltages +V and −V. The commutation logic 44 may operate in any suitable manner, such as by driving the switches 58 as linear amplifiers that apply continuous-time sinusoidal voltages to the windings. In another embodiment, the commutation logic 56 may drive the switches 58 using pulse width modulation (PWM), such as using square wave PWM, trapezoidal PWM, or sinusoidal PWM. Regardless as to how the windings are driven, the commutation controller 44 generates the control signal 54 so that the windings are commutated at the correct periods, thereby generating the desired rotating magnetic field that causes the spindle motor to rotate. In one embodiment, the spindle control block 46 may generate a control signal 60 that controls the effective amplitude of the periodic driving voltage applied to the windings (continuous or PWM), thereby controlling the speed of the spindle motor 18.

If a power failure occurs while the disk 16 is spinning, there is residual kinetic energy as the disk 16 continues to rotate the spindle motor 18, and therefore the spindle motor 18 can be converted into a power generator used to power the control circuitry 22 while executing power down operations, such as completing a current write operation to the disk 16 before unloading the head 20 onto a ramp. In one embodiment, the spindle motor 18 may generate power by sourcing current to the supply voltage Vpwr 62 when the supply voltage Vpwr 62 falls below a threshold (e.g., due to a power failure or other power transient event).

Figure 4A:
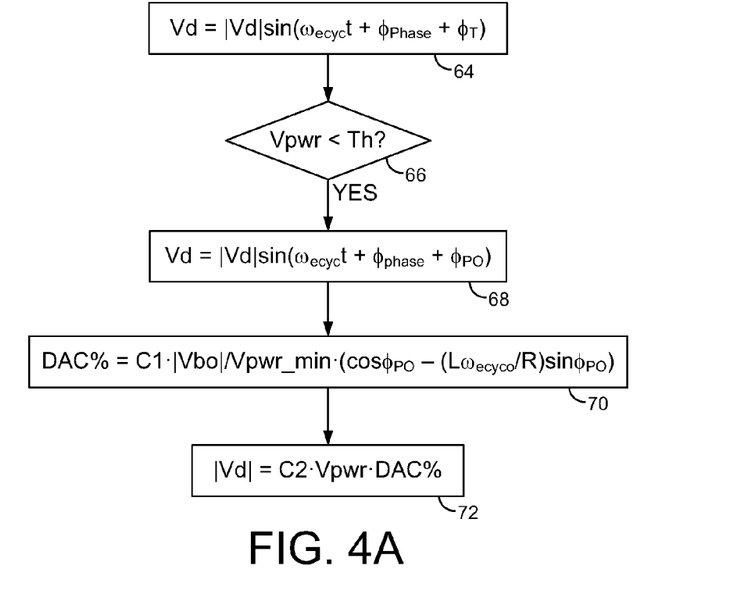
FIG. 4A is a flow diagram according to an embodiment wherein a digital-to-analog converter (DAC) value (scalar) is configured based on the phase offset, and the amplitude of the periodic driving voltage is configured based on the DAC value.

FIG. 4A is a flow diagram according to an embodiment wherein the periodic driving voltage Vd for driving the windings of the spindle motor is generated (block 64) while rotating the disk during normal operation based on:

$$Vd = |Vd|\sin(\omega_{ecyc} t + \phi_{phase} + \phi_T)$$

where $|Vd|$ represents the amplitude of the periodic driving voltage, $\omega_{ecyc}$ represents the rotation frequency (in electrical cycles), $\phi_{phase}$ represents a phase offset that corresponds to the phase of the winding, and $\phi_T$ represents a phase offset that applies an accelerating force to the spindle motor. When the supply voltage Vpwr 62 falls below the threshold at block 66 (e.g., during a power failure), the periodic driving voltage Vd is generated (block 68) based on:

$$Vd = |Vd|\sin(\omega_{ecyc} t + \phi_{phase} + \phi_{PO})$$

where $\phi_{PO}$ represents a phase offset that operates to brake the spindle motor. The amplitude $|Vd|$ of the periodic driving voltage is also reduced based on the phase offset $\phi_{PO}$ which causes the windings of the spindle motor to source current to the supply voltage Vpwr 62. In the embodiment of FIG. 4A, the amplitude of the periodic driving voltage $|Vd|$ is configured based on a digital-to-analog converter (DAC) value. For example, the amplitude of the periodic driving voltage $|Vd|$ may be configured (block 72) based on:

$$C2 \cdot Vpwr \cdot DAC\%$$

where C2 represents a scalar and DAC % represents the DAC value (a scalar) as a percentage of a DAC range (from 0 to 100%). In one embodiment, the spindle motor 18 comprises a three phase spindle motor such that the scalar C2 in the above equation may be $1/\sqrt{3}$. In one embodiment, the DAC value in the above equation is configured (block 70) so as to substantially maximize the power generated by the spindle motor 18 relative to the selected phase offset $\phi_{PO}$ under a worst case load condition during the power failure event. To satisfy this condition, in one embodiment the DAC value is configured based on:

$$C1 \cdot \frac{|Vbo|}{Vpwr\_min}\left(\cos\phi_{PO} - \frac{L\omega_{ecyco}}{R}\sin\phi_{PO}\right)$$

where C1 represents a scalar, $|Vbo|$ represents an amplitude of a sinusoidal back electromotive force (BEMF) voltage generated by one of the windings, L represents an inductance of the winding, $\omega_{ecyco}$ represents a frequency of the sinusoidal BEMF voltage generated by the winding, R represents a resistance of the winding, and Vpwr_min represents a minimum amplitude of the supply voltage. In one embodiment, the spindle motor 18 comprises a three phase spindle motor such that the scalar C1 in the above equation may be $\sqrt{3}/2$.

Figure 4B:
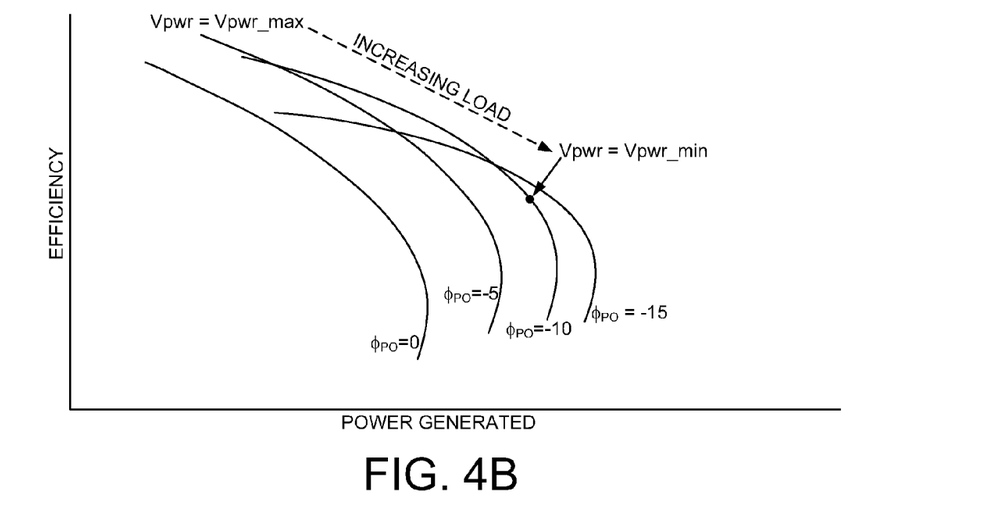
FIG. 4B shows a number of efficiency versus power generation curves for a plurality of different phase offset values according to an embodiment.

FIG. 4B shows a number of efficiency versus power generation curves for a plurality of different phase offset values. In this embodiment, as the phase offset increases the peak power generated by the spindle motor 18 increases, whereas the efficiency of the power generation decreases. Any suitable phase offset may be selected to achieve a desired balance between peak power and efficiency. For a selected phase offset (e.g., $\phi_{PO} = -5$ degrees), when the load powered by the supply voltage Vpwr is minimum, the supply voltage Vpwr will reach a maximum Vpwr_max. As the load increases, the supply voltage Vpwr will decrease so that the spindle motor sources more current (provides more power). When the load increases to a worst case condition, the supply voltage Vpwr will reach the above described minimum Vpwr_min wherein the spindle motor 18 generates the maximum power. Any suitable value may be selected for the minimum Vpwr_min, wherein in one embodiment the value is selected based on the worst case load condition of the disk drive during the power failure event (i.e., the maximum voltage needed to safely perform the power fail operations such as parking the head).

Figure 5:
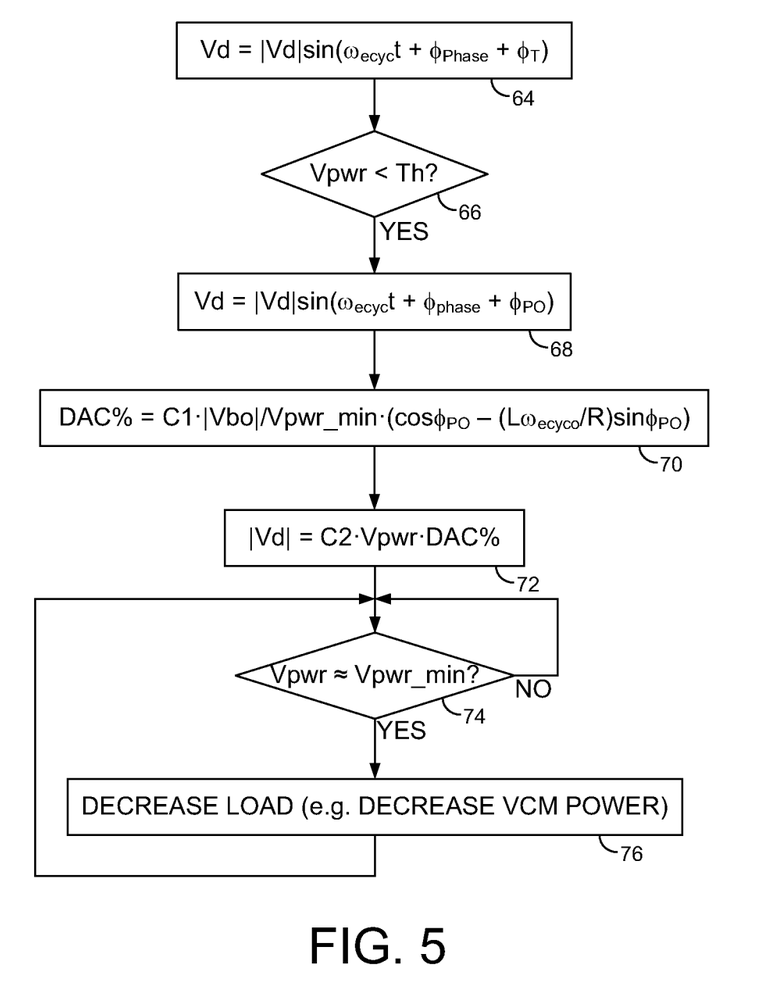
FIG. 5 is a flow diagram according to an embodiment wherein when the supply voltage falls to a minimum value, a load of the disk drive is reduced such as by reducing a power consumed by a voice coil motor configured to actuate the head radially over the disk.

FIG. 5 is a flow diagram which extends on the flow diagram of FIG. 4B, wherein in this embodiment, the amplitude of the supply voltage Vpwr 62 is monitored during the power failure event, and if the amplitude substantially equals the minimum Vpwr_min (block 74), the load from the disk drive is decreased (block 76). For example, in one embodiment Vpwr_min is selected based on a peak power needed to park the head (e.g., on a ramp) under worst case conditions. If the supply voltage Vpwr falls to Vpwr_min, the load may be decreased in one embodiment by reducing the power consumed when parking the head. For example, the power consumed when parking the head may be reduced by reducing a power consumed by the VCM 38 in FIG. 2A (e.g., by reducing the driving current and therefore the speed of the park operation). In this embodiment, reducing the load from the disk drive causes the supply voltage Vpwr to rise and remain above Vpwr_min as illustrated in FIG. 4B. In one embodiment, when the load on the disk drive decreases causing the supply voltage Vpwr to rise significantly above Vpwr_min, the control circuitry may reconfigure the load such as by increasing the amount of power consumed by the VCM 38 (e.g., by increasing the driving current to increase the speed of the park operation).

The following is a derivation of the above embodiment for selecting the DAC value (for a three phase spindle motor) that results in the maximum power being generated by the spindle motor 18 when the supply voltage Vpwr reaches the minimum value Vpwr_min under the worst case load condition. The phasor model of the spindle motor:

$$|V_d| = |V_b|e^{-j\phi PO} + (R+jL\omega_{eyc})I$$

$$I = \frac{|V_d| - |V_b|e^{-j\phi PO}}{R + jL\omega_{eyc}} = \frac{(|V_d| - |V_b|e^{-j\phi PO})(R - jL\omega_{eyc})}{R^2 + L^2\omega_{eyc}^2}$$

The power generated by the spindle motor:

$$P_{gen} = -\frac{3}{2}\text{Re}\{\overline{V_d}I\} = -\frac{3}{2}|V_d|\text{Re}\{I\}$$

$$\text{Re}\{I\} = \frac{|V_d|R - |V_b|(R\cos\phi_{PO} - L\omega_{eyc}\sin\phi_{PO})}{R^2 + L^2\omega_{eyc}^2}$$

$$P_{gen} = -\frac{3}{2}\frac{|V_d|^2 R - |V_d||V_b|(R\cos\phi_{PO} - L\omega_{eyc}\sin\phi_{PO})}{R^2 + L^2\omega_{eyc}^2}$$

To maximize the power generated when Vpwr reaches the minimum value Vpwr_min:

$$\frac{\partial P_{gen}}{\partial DAC} = 0$$

$$2|V_d|^* R - |V_b|(R\cos\phi_{PO} - L\omega_{eyc}\sin\phi_{PO}) = 0$$

$$|V_d|^* = \frac{|V_b|(R\cos\phi_{PO} - L\omega_{eyc}\sin\phi_{PO})}{2R}$$

$$DAC\ \%^* = \frac{\sqrt{3}}{2}\frac{|V_{b0}|}{\text{Vpwr\_min}}\left(\cos\phi_{PO} - \frac{L\omega_{ecyc0}}{R}\sin\phi_{PO}\right)$$

$$\frac{\partial^2 P_{gen}}{\partial DAC^2} = -\sqrt{3}\,V_{pwr}R < 0 : \text{Maximum Power Generated}$$

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a spindle motor configured to rotate the disk, wherein the spindle motor comprises a plurality of windings;
   a head actuated over the disk; and
   control circuitry powered by a supply voltage, the control circuitry configured to:
   commutate the windings based on a commutation sequence while applying a periodic driving voltage to each winding, wherein the periodic driving voltage comprises an operating amplitude during normal operation; and
   when the supply voltage falls below a threshold, configure the spindle motor into a power generator by at least adjusting a phase of the periodic driving voltage by a phase offset and by adjusting the amplitude of the periodic driving voltage based on the phase offset.

2. The data storage device as recited in claim 1, wherein the control circuitry is further configured to adjust the amplitude of the periodic driving voltage based on:

$$C1 \cdot \frac{|V_{b0}|}{\text{Vpwr\_min}}\left(\cos\phi_{PO} - \frac{L\omega_{ecyco}}{R}\sin\phi_{PO}\right)$$

where:
C1 represents a scalar;
|Vbo| represents an amplitude of a sinusoidal back electromotive force (BEMF) voltage generated by one of the windings;

L represents an inductance of the winding;
$\omega_{ecyco}$ represents a frequency of the sinusoidal BEMF voltage generated by the winding;
R represents a resistance of the winding;
$\phi_{PO}$ represents the phase offset relative to the sinusoidal BEMF voltage; and
Vpwr_min represents a minimum amplitude of the supply voltage.

3. The data storage device as recited in claim 2, wherein an amplitude of the periodic driving voltage is generated based on:

$$C2 \cdot V\text{pwr} \cdot DAC\ \%$$

where:
C2 represents a scalar;
Vpwr represents the supply voltage; and
DAC % represents a scalar.

4. The data storage device as recited in claim 3, wherein:

$$DAC\ \% = C1 \cdot \frac{|Vbo|}{V\text{pwr\_min}} \left( \cos\phi_{PO} - \frac{L\omega_{ecyco}}{R} \sin\phi_{PO} \right).$$

5. The data storage device as recited in claim 4, wherein the spindle motor generates a peak power when Vpwr falls to Vpwr_min.

6. The data storage device as recited in claim 5, wherein Vpwr_min is selected based on a peak power needed to park the head under worst case conditions.

7. The data storage device as recited in claim 6, wherein when Vpwr substantially equals Vpwr_min the control circuitry is further configured to reduce the power consumed when parking the head.

8. The data storage device as recited in claim 7, wherein when Vpwr substantially equals Vpwr_min, the control circuitry is configured to reduce the power consumed when parking the head by reducing a power consumed by a voice coil motor configured to actuate the head radially over the disk.

9. The data storage device as recited in claim 3, wherein a power generating efficiency of the spindle motor increases as Vpwr rises above Vpwr_min.

10. The data storage device as recited in claim 9, wherein Vpwr rises above Vpwr_min when a load powered by the spindle motor decreases.

11. A method of operating a data storage device, the method comprising:
rotating a disk using a spindle motor comprising a plurality of windings;
actuating a head over the disk;
commutating the windings based on a commutation sequence while applying a periodic driving voltage to each winding, wherein the periodic driving voltage comprises an operating amplitude during normal operation; and
when a supply voltage falls below a threshold, configuring the spindle motor into a power generator by adjusting a phase of the periodic driving voltage by a phase offset and by at least adjusting the amplitude of the periodic driving voltage based on the phase offset.

12. The method as recited in claim 11, further comprising adjusting the amplitude of the periodic driving voltage based on:

$$C1 \cdot \frac{|Vbo|}{V\text{pwr\_min}} \left( \cos\phi_{PO} - \frac{L\omega_{ecyco}}{R} \sin\phi_{PO} \right)$$

where:
C1 represents a scalar;
|Vbo| represents an amplitude of a sinusoidal back electromotive force (BEMF) voltage generated by one of the windings;
L represents an inductance of the winding;
$\omega_{ecyco}$ represents a frequency of the sinusoidal BEMF voltage generated by the winding;
R represents a resistance of the winding;
$\phi_{PO}$ represents the phase offset relative to the sinusoidal BEMF voltage; and
Vpwr_min represents a minimum amplitude of the supply voltage.

13. The method as recited in claim 12, wherein an amplitude of the periodic driving voltage is generated based on:

$$C2 \cdot V\text{pwr} \cdot DAC\ \%$$

where:
C2 represents a scalar;
Vpwr represents the supply voltage; and
DAC % represents a scalar.

14. The method as recited in claim 13, wherein:

$$DAC\ \% = C1 \cdot \frac{|Vbo|}{V\text{pwr\_min}} \left( \cos\phi_{PO} - \frac{L\omega_{ecyco}}{R} \sin\phi_{PO} \right).$$

15. The method as recited in claim 14, wherein the spindle motor generates a peak power when Vpwr falls to Vpwr_min.

16. The method as recited in claim 15, wherein Vpwr_min is selected based on a peak power needed to park the head under worst case conditions.

17. The method as recited in claim 16, wherein when Vpwr substantially equals Vpwr_min the method further comprises reducing the power consumed when parking the head.

18. The method as recited in claim 17, wherein when Vpwr substantially equals Vpwr_min, the method further comprises reducing the power consumed when parking the head by reducing a power consumed by a voice coil motor configured to actuate the head radially over the disk.

19. The method as recited in claim 13, wherein a power generating efficiency of the spindle motor increases as Vpwr rises above Vpwr_min.

20. The method as recited in claim 19, wherein Vpwr rises above Vpwr_min when a load powered by the spindle motor decreases.

21. Control circuitry powered by a supply voltage, the control circuitry configured to:
commutate windings of a spindle motor based on a commutation sequence while applying a periodic driving voltage to each winding, wherein the periodic driving voltage comprises an operating amplitude during normal operation; and
when the supply voltage falls below a threshold, configure the spindle motor into a power generator by at least adjusting a phase of the periodic driving voltage by a phase offset and adjusting the amplitude of the periodic driving voltage based on the phase offset.

22. The control circuitry as recited in claim 21, further configured to adjust the amplitude of the periodic driving voltage based on:

$$C1 \cdot \frac{|Vbo|}{\text{Vpwr\_min}}\left(\cos\phi_{PO} - \frac{L\omega_{ecyco}}{R}\sin\phi_{PO}\right)$$

where:
C1 represents a scalar;
|Vbo| represents an amplitude of a sinusoidal back electromotive force (BEMF) voltage generated by one of the windings;
L represents an inductance of the winding;
$\omega_{ecyco}$ represents a frequency of the sinusoidal BEMF voltage generated by the winding;
R represents a resistance of the winding;
$\phi_{PO}$ represents the phase offset relative to the sinusoidal BEMF voltage; and
Vpwr_min represents a minimum amplitude of the supply voltage.

23. The control circuitry as recited in claim 22, wherein an amplitude of the periodic driving voltage is generated based on:

$$C2 \cdot V\text{pwr} \cdot DAC\ \%$$

where:
C2 represents a scalar;
Vpwr represents the supply voltage; and
DAC % represents a scalar.

24. The control circuitry as recited in claim 23, wherein:

$$DAC\ \% = C1 \cdot \frac{|Vbo|}{\text{Vpwr\_min}}\left(\cos\phi_{PO} - \frac{L\omega_{ecyco}}{R}\sin\phi_{PO}\right).$$

\* \* \* \* \*